April 8, 1952  F. A. DUBBS  2,592,397
SLED OR SLEIGH
Filed Feb. 21, 1950

INVENTOR:
Frederick A. Dubbs
BY Paul & Paul
ATTORNEYS.

UNITED STATES PATENT OFFICE 2,592,397

SLED OR SLEIGH

Frederick A. Dubbs, Philadelphia, Pa.

Application February 21, 1950, Serial No. 145,370

3 Claims. (Cl. 280—16)

This invention relates to sleds. More particularly, it is concerned with sleds or sleighs of a steerable type commonly known as bob sleds or sleighs in which the tops or bodies are supported by two pairs of runners in tandem relation.

My invention is directed toward the provision of a sled or sleigh of the kind referred to which is light and yet sturdy for ability to withstand rough usage; which is capable of gliding over "bumps" or other obstructions easily and smoothly in either straight away or curved travel; and which is easily steered and controlled.

Figure 1:
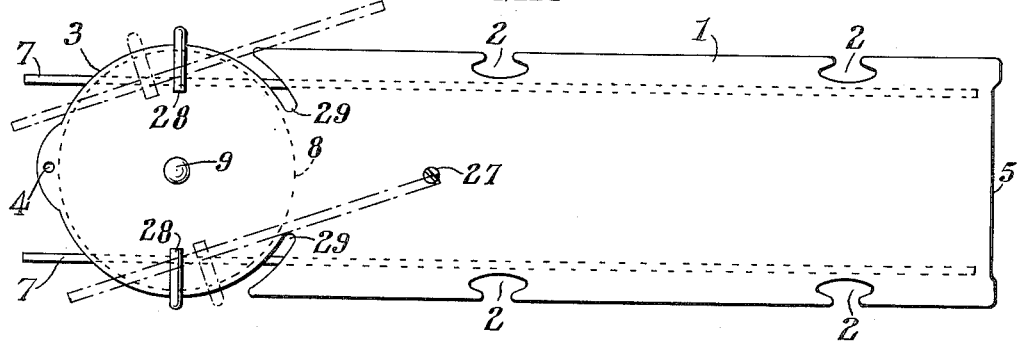

How the foregoing, as well as other important objects and attendant advantages are realized in practice, will appear from the following detailed description of the attached drawings, wherein Fig. 1 shows the top plan view of a sled or sleigh conveniently embodying my invention.

Figure 2:
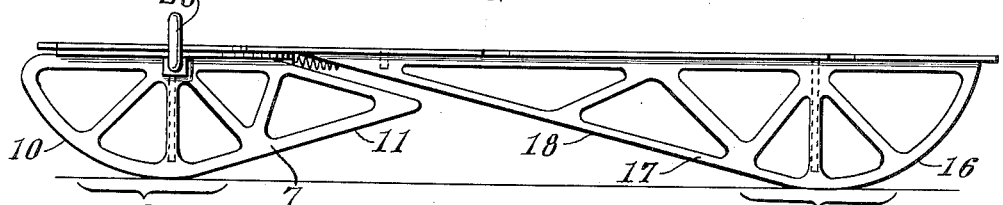

Fig. 2 shows the sled in side elevation.

Figure 3:
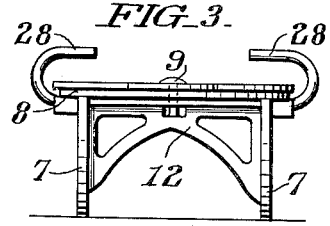
Figure 4:
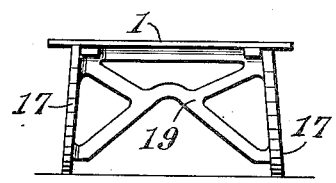

Figs. 3 and 4 respectively show the front and rear elevations of the sled; and

Figure 5:
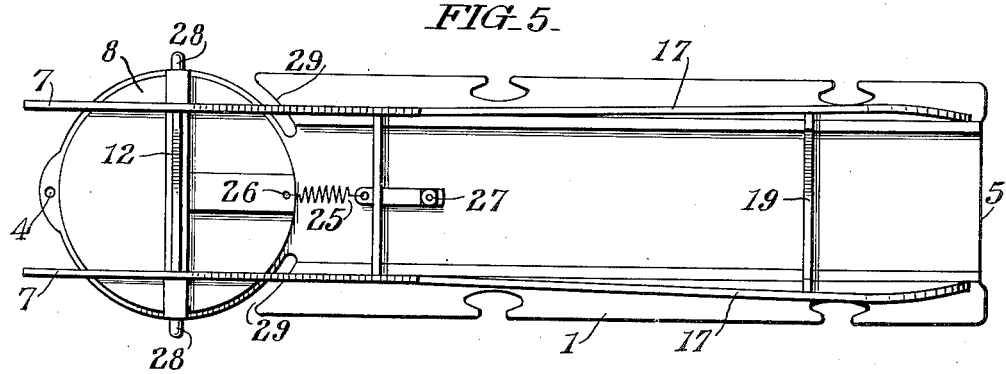

Fig. 5 shows the sled in bottom plan.

As herein exemplified, my improved sled or sleigh has a flat top or body board 1 whereof the parallel side edges are provided at intervals with hand grasp notches 2, whereof the front end is rounded as at 3 and apertured as at 4 for connection of a tow rope, and whereof the rear end is square except for slight medial recession of its edge as at 5. At the front end of the sled, the top board 1 is supported by a runner structure 6 with parallel runners 7 secured to a disk or "fifth wheel" 8 which underlies said board and swivels about a centrally-located vertical axis pivot bolt 9. The runners 7 have convexly rounded front edge portions 10 of which the centers of curvature lie in the vertical transverse plane through the swivel axis 9, and tangentially mergent straight edge portions 11 which extend rearwardly and upwardly at a relatively sharp acute angle to the horizontal. For the sake of lightness, the runners 7 are preferably made as suitably braced open frames as shown, and connected by a crosswise arched truss 12 in the vertical transverse plane through the swivel axis.

At the rear end of the sled, the top board 1 is supported by a rigidly connected runner structure 15 which is generally similar to the front runner structure 6 but somewhat longer and reversely arranged. Extending forwardly and upwardly as tangentially mergent continuations of the convexly rounded rear edge portions 16 of the runners 17 of the rear supporting structure are straight edge portions 18 which are likewise inclined at relatively sharp acute angle corresponding substantially to the angle of inclination of the straight edge portions 11 of the steering runners 7. Also like the steering runners 7, the rear runners 17 are made as suitably braced open frames with a crosswise arched truss 19 rigidly uniting them in the vertical transverse plane containing the centers from which the rounded bottom edge portions 16 of said rear runners are struck. It is to be particularly noted that the front ends of the runners 17 of the rear supporting structure 15 are overlapped to a very considerable extent by the back ends of the runners 7 of the steering structure 6.

In order to maintain the runners 7 of the steering structure 6 normally in alignment with the runners 17 of the rear supporting structure 15, I have shown a helical tension spring 25 whereof one end is connected at 26 to the edge of the disk 8, and whereof the other end is connected to a fixed anchorage stud 27 centrally of the under side of the top board 1 as best seen in Fig. 5.

For the purpose of steering the sled, I have provided hand grasps 28 at diametrically opposite points on the steering disk or fifth wheel 8. From Fig. 3 it will be observed that these hand grasps extend first upwardly from the disk 8 and then horizontally inward over the top board 1 so as to be conveniently accessible to a person either sitting or lying prone on the sled. The hands of the sledder are thus kept within the confines of the top board, safe against the possibility of injury by encounter with obstructions along the path in travel of the sled. As shown in Figs. 1 and 3, the top board is formed in its opposite side edges with arcuate notches 29 concentric with the pivot axis 9 to clear the upstanding portions of the grasps 28.

Due to the rounding of the runners 7 and 17 at 10 and 16, only single point contacts are made by them with the ground so that the resistance offered to movement of the sled on ice and snow is practically negligible. Moreover by reason of the counter inclination of the runners 7 and 17 at 11 and 18, overtravel of bumps or other obstructions is rendered easy with avoidance of sudden rises and drops of the sled either in straight away or in curved travel, the rear runners 17 taking over immediately after the front runners 7 as a consequence of the overlap between their contiguous ends. Furthermore, the single point ground contact runners not only favor easy turning without attendant jerks or slide arounds, but prevent piling up of snow and/or ice when turning and thus preclude upsets incident to making the turns.

Having thus described my invention, I claim:

1. In a sled or sleigh, an elongate top or body board; a pair of parallel steering runners having inwardly-rounded frontal edge portions and straight edge portions in tangential relation to said rounded edge portions extending upwardly and rearwardly at a relatively sharp acute angle to the horizontal to a point approximately midway of the length of the body board; and a pair of fixed parallel rear runners with upwardly-rounded rear edge portions and straight edge portions in tangential relation to said rounded edge portions extending upwardly and forwardly at a similar relatively sharp acute angle to the horizontal to a point somewhat beyond the center of the body board into overlapping relation with the rearwardly extending inclined edge portions of the steering runners.

2. A sled or sleigh according to claim 1, wherein the steering runners are affixed to a disk which is pivoted centrally of the body board adjacent the front end of the latter, the axis of the pivot lying in a vertical transverse plane containing the points of tangency between the curved and straight edge portions of the steering runners.

3. A sled or sleigh according to claim 1, wherein the steering runners are affixed to a disk which is pivoted centrally of the body board adjacent the front end of the latter and wherein the disk is provided at its edge and at diametrically opposite points with hand grasps which extend inwardly over the opposite side edges of the body board.

FREDERICK A. DUBBS.

REFERENCES CITED

The following references are of record in the file of this patent:

UNITED STATES PATENTS

| Number | Name | Date |
|---|---|---|
| 233,200 | Buckingham | Oct. 12, 1880 |
| 1,683,846 | Robertson | Sept. 11, 1928 |
| 1,722,012 | Michilli | July 23, 1929 |
| 2,470,448 | Warrender | May 17, 1949 |